United States Patent Office 2,736,231
Patented Feb. 28, 1956

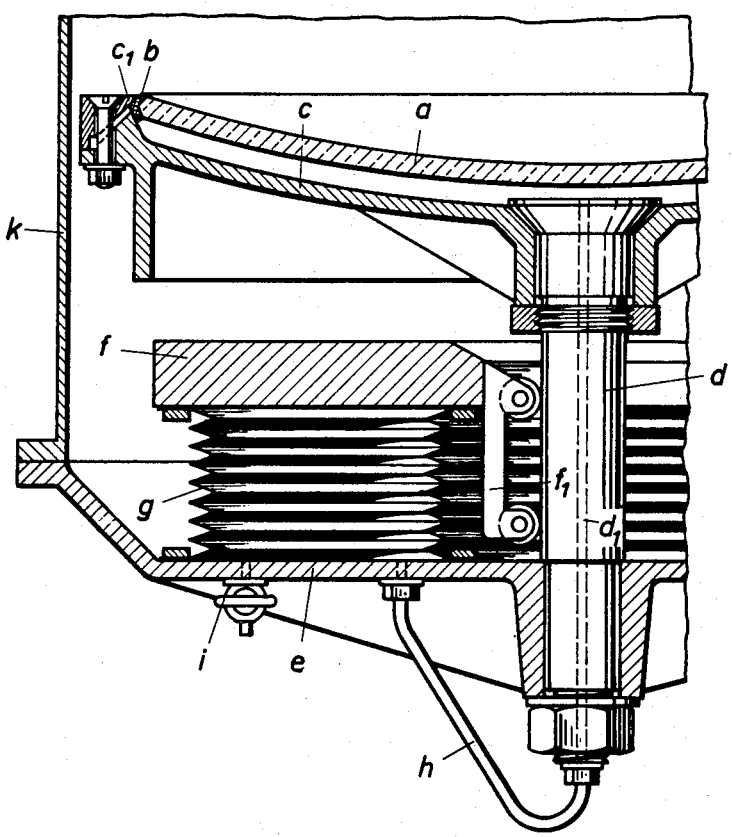

2,736,231

MOUNTING FOR TELESCOPE MIRRORS

Walther Bauersfeld, Heidenheim (Brenz), Wurttemberg, Germany, assignor to Carl Zeiss, Heidenheim (Brenz), Germany Application June 27, 1952, Serial No. 295,963

Claims priority, application Germany June 29, 1951

2 Claims. (Cl. 88—32)

In the construction of larger astronomical reflecting telescopes or similar optical instruments, the relatively great weight of the mirrors, especially of the principal mirror of telescopes, occasions various difficulties and therewith a series of constructive measures to make possible, in spite of the great weights to be moved, a precise adjustment and guidance of the telescope. The great weight of the mirror is due first of all to the great thickness of the mirror, which hitherto has been necessary in order that the mirror does not lose or change the precise shape of the optically effective surface due to possible elastic deformations already during the figuring and later through the various positions in use. If it were possible to meet these requirements also with a smaller thickness of the mirror, then the entire mounting of the telescope could be made essentially simpler and therewith also the handling of the telescope facilitated.

The invention now offers a procedure for ensuring the precise mirror shape also with considerably smaller mirror thickness, so that the total weight of telescope and mounting can be reduced and the mobility of the telescope improved. This procedure consists of uniformly embedding the mirror at its margin all around in a mounting body with utilization of tight intermediary layers (e. g. rubber or cork) and at the same time so shape the mounting body that a hollow space is formed at the rear of the mirror, shut off from the outside, and that further the pressure of the gas filling this hollow space is automatically so regulated, that in every position of the mirror the weight component of the mirror perpendicular to the mirror surface is counterbalanced. In this manner one can attain, also with relatively very thin mirrors, that no deformation of the mirror, and therewith also no change of its optically effective surface takes place under the influence of the mirror's own weight. The automatic regulation of the gas pressure in the hollow space behind the mirror can take place in different ways with known means. A simple solution results if one connects the hollow space by means of appropriate conduits with a second, bellows-like enclosed space, which is under the pressure of a weight which is guided, practically frictionless, parallel to the mirror axis. The pressure produced in the interior of the bellows by this movable weight is transmitted to the hollow space behind the mirror; and since the weight can move only parallel to the mirror axis, the internal pressure increases, in the same measure in which the mirror axis is displaced from the horizontal to the vertical position. Therefore there results hereby in every position of the mirror a compensation of the weight component which is parallel to the mirror axis. The configuration of the second, bellows-like enclosed hollow space can be carried out as desired; for example a ring-shaped bellows surrounding the mirror axis can be used, or also several smaller bellows equally distributed about the mirror axis and connected with one another.

With concave mirrors, as e. g. paraboloid or spherical mirrors, the achieved compensation as described is not altogether complete, because as a consequence of the curvature, the mirror's own weight can produce slight deformations also with a horizontal mirror axis. However also this can be avoided if the two hollow spaces are filled with a gas of higher specific gravity than air. It is possible to so select the specific gravity of this gas that the weight compensation is completely attained over the entire mirror surface. If for instance it is a case of a concave mirror with a relative aperture of 1:4 and a uniform mirror thickness over the entire radius=$\frac{1}{60}$ of the diameter, then there is required for this a gas with a weight of 6.5 kg./m.$^3$ (at 760 mm. Hg). This requirement is met e. g. by sulfur hexafluoride.

It is also to be noted, that one can advantageously use the described compensating mounting already in the production of such thin-walled mirrors, so that already in figuring the mirror surface the influence of the mirror's own weight is counterbalanced. Thereby in addition the pressure in the two hollow spaces will be increased to the extent that the pressure exerted on the mirror surface by the working tools will also be counterbalanced.

The idea of the invention is illustrated in the drawing by an execution example, that is, a section along the mirror axis of an astronomical telescope is represented with the essential details. A concave mirror $a$, which has throughout an approximately uniform thickness and whose periphery is bevelled on both sides, rests on a mounting body $c$ with the interposition of a rubber ring $b$ fitted to the mirror rim, and is uniformly and tightly clamped by a ring $c_1$ which is screwed all around to the mounting body. The mounting body $c$ is so designed that the hollow space remaining between the mirror $a$ and the bottom of the mounting body $c$ is tightly enclosed on all sides. In the middle the mounting body $c$ is tightly screwed to a carrier axis $d$, which for its part is firmly connected with a base plate $e$. Between the mounting body $c$ and the base plate $e$ is a ring-shaped weight $f$, which is connected with the base plate $e$ by a bellows $g$. The space enclosed by the bellows $g$ is sealed on all sides; however, through a tubular connection $h$ and a central boring $d_1$ of the carrier axis $d$, a permanent connection exists with the hollow space formed behind the mirror $a$. The weight $f$ on the side towards the axis is provided with three guide attachments $f_1$, each of which carries, mounted one above the other, two guide rollers. Therewith the weight $f$ is guided practically frictionless in the direction of the carrier axis $d$. On the outer side of the base plate $e$ there is also a valve $i$, with the aid of which a gas serving for relieving the load can be introduced and replenished in the hollow space of the bellows $g$ and therewith also in the hollow space behind the mirror $a$. At the outer rim the base plate $e$ is screwed to a telescope casing $k$, to which the telescope is to be thought of as mounted in its entirety in customary manner.

In the illustrated vertical position the weight $f$ presses with its full magnitude upon the gas in the interior of the bellows $g$ and therewith through the tube connection $h$ and the boring $d_1$ of the carrier axis $d$ relieves the load on the mirror $a$ so that its own weight is counterbalanced. In the degree to which the telescope axis is inclined only the component of the weight $f$ which is parallel to the telescope axis is effective, so that the internal pressure in the bellows and behind the mirror correspondingly diminishes. In horizontal position of the mirror axis the weight $f$ is inactive; then only the load relief caused by the greater specific gravity of the filling gas remains, whose magnitude must be adjusted to the dimensions of the mirror by the specific gravity of the filling gas.

I claim:

1. In a mounting for concave telescope mirrors of large diameter comprising a mounting body having an annular marginal bearing surface engaging said mirror, means for tightly embedding said mirror at all its marginal points, said mounting body and said mirror forming an air-tight sealed chamber behind the mirror, a second chamber of bellows-like form fixed to said mounting body and having a movable cover plate and a weight body connected to said cover plate, means for practically frictionless guiding said weight body parallel to the axis of said mirror, a gas arranged in both said chambers, means interconnecting said second chamber with said first chamber so that said weight body presses the gas in dependence from the inclination of the mirror against the rear mirror surface, said gas having a specific gravity greater than air for achieving complete equalization of the weight components of the mirror in the case that the optical axis of the mirror lies horizontal.

2. Mounting for concave telescope mirrors of large diameter as in claim 1, characterized in that the aperture of the concave mirror is 1:4, that the mirror has a uniform thickness of $\frac{1}{60}$ of its diameter, and that the gas has a weight of 6.5 kg./m.$^3$ (at 760 mm. Hg) such as sulfur hexafluoride.

References Cited in the file of this patent

UNITED STATES PATENTS

| | | |
|---|---|---|
| 1,734,284 | Blair | Nov. 5, 1929 |
| 2,003,171 | Burrell | May 28, 1935 |

FOREIGN PATENTS

| | | |
|---|---|---|
| 987,988 | France | Apr. 25, 1951 |